United States Patent [19]

Hille et al.

[11] Patent Number: 5,648,410
[45] Date of Patent: Jul. 15, 1997

[54] AQUEOUS POLYMER DISPERSIONS FOR CLEAR COATS

[75] Inventors: Hans Dieter Hille, Bergisch Gladbach; Horst Muller, Cologne, both of Germany

[73] Assignee: Bollig & Kemper KG, Cologne, Germany

[21] Appl. No.: 448,399

[22] PCT Filed: Dec. 14, 1993

[86] PCT No.: PCT/EP93/03530

§ 371 Date: Jun. 7, 1995

§ 102(e) Date: Jun. 7, 1995

[87] PCT Pub. No.: WO94/13720

PCT Pub. Date: Jun. 23, 1994

[30] Foreign Application Priority Data

Dec. 16, 1992 [DE] Germany ............... 42 42 518.2

[51] Int. Cl.$^6$ .................................................. C08L 51/08
[52] U.S. Cl. ..................... 523/501; 525/28; 525/30; 525/39; 525/48; 525/63; 525/69; 525/131; 525/162; 525/163; 525/176; 525/440; 525/443
[58] Field of Search .................... 523/501; 525/48, 525/39, 176, 443, 440, 131, 162, 163, 28, 30, 63, 69

[56] References Cited

U.S. PATENT DOCUMENTS

| | | | |
|---|---|---|---|
| 4,100,127 | 7/1978 | Fukusaki et al. | 260/29.6 |
| 4,259,224 | 3/1981 | Dalibor et al. | 260/31.2 |
| 4,517,322 | 5/1985 | Birkmeyer et al. | 523/501 |
| 4,873,281 | 10/1989 | Maska | 324/457 |
| 5,015,688 | 5/1991 | Bederke et al. | 524/600 |
| 5,322,865 | 6/1994 | Inoue | 523/501 |

FOREIGN PATENT DOCUMENTS

| | | |
|---|---|---|
| 31 28 062 | 2/1983 | Germany . |
| 0 305 795 | 8/1989 | Germany . |
| 0 391 271 | 10/1990 | Germany . |
| 40 09 932 | 10/1991 | Germany . |
| 40 27 594 | 3/1992 | Germany . |

*Primary Examiner*—Patricia A. Short
*Attorney, Agent, or Firm*—Banner & Witcoff, Ltd.

[57] ABSTRACT

The invention relates to an aqueous polyester- and acrylate-based polymer dispersion, obtainable by free radical-initiated polymerization of at least (a) one (meth)acrylic acid ester,
(b) one ethylenically unsaturated, at least monofunctional acid, and optionally
(c) one ethylenically unsaturated monomer other than (a) and (b), or mixtures thereof with a polyester resin capable of undergoing a free radical-initiated polymerization. The invention further relates to the production of these aqueous polymer dispersions, to aqueous clear coat compositions containing said dispersions, and to the use thereof.

33 Claims, No Drawings

AQUEOUS POLYMER DISPERSIONS FOR CLEAR COATS

The invention relates to aqueous polymer dispersions of polyester- and acrylate-based graft polymers, to processes for the production thereof, to aqueous clear-coat compositions containing said dispersions, and to the use of same.

A reduction of the contents of organic solvents in coating compositions is generally desired. There is great interest in aqueous lacquer systems in the area of coating and painting, especially so in the field of automotive painting, but also in other areas.

In the production-line painting of automotive bodies, multi-layer coatings according to the so-called "base coating/clear coating" process are preferred. Therein, first a pigmented base coating is applied which, after some short exposition to air without a baking step, is covered with a clear-coat composition. Then the base coating and clear coating compositions in combination are subjected to baking. This procedure results in coatings having an optically and technologically very high quality.

As far as primers and base coatings are concerned, aqueous systems for a long time have belonged to the state of the art, and in part the use thereof has become a standard operation in the automobile industry. Thus, it is generally desirable to develop and appropriately use a suitable aqueous system for the topmost layer, i.e. the clear coat.

To serve this purpose, such an aqueous clear-coat composition with respect to its profile of properties must at least be a match for the conventional clear-coat compositions dissolved in organic solvents. The solid contents at the spray viscosity must be high such as to provide sufficient layer thicknesses by one or two spraying steps. Furthermore, the clear coat films when baked must be well levelled and exhibit high gloss. In addition, the film should be clear and be "full" and have a good "standing".

Also important is reparability. Repair painting to form a well-adhering gravel-resistant coating must be possible, most desirably without grinding by using any conventional base coating, on a first paint already formed by final baking. Furthermore, there must be constituted a good resistance against chemical attacks such as, e.g., against fuel, acids (sulfuric acid) or lyes. Very important is resistance to condensed water.

DE-OS 31 28 062 describes aqueous dispersions of copolymers preparable from styrene, (meth-)acrylic acid esters, vinyl esters, monomers containing hydroxyl groups, (meth-)acrylic acid, optionally acryl- and/or methacrylamide and addition compounds of glycidyl esters of branched monocarboxylic esters by polymerization with unsaturated carboxylic acids in the presence of an anionic emulsifier. Therefrom, heat-curable coatings are obtained in combination with aminoplastic resins. In accordance with the Application Examples 3 and 4 provided therein, these emulsion polymers were said to be suitable in combination with conventional metallic base coatings for producing weather-resistant two-layer coatings. The reparability and resistance to condensed water during 240 h at 40° C. constant climate (DIN 50017), however, are not attained in combination with aqueous base coatings.

EP-A-0 365 775, DE-OS 38 34 738, DE-OS 40 09 931 and DE-OS 40 09 932 describe solution polymers which are prepared by polymerizing carboxyl group-free and carboxyl group-containing monomers in sequence or alternatingly in partial amounts in an organic solvent by way of a free radical-initiated polymerization. The stability of the clear coat films made therefrom, especially towards sulfuric acid and sodium hydroxide solution, is by far not sufficient.

In EP-A-0 391 271 there have been described aqueous coating compositions which contain, as the main component, a polyester oligomer polyacrylate produced by a free radical-initiated polymerization of ethylenically unsaturated monomers in a hydroxy-functional polyester oligomer which is not polymerizable via a radical-initiated polymerization. The resistance to sulfuric acid of the clear-coat films made therefrom is very poor.

DE-OS 40 27 594 describes aqueous clear-coat compositions which contain, as binders, emulsion polymers which have been produced with the concomitant use of specific fluorinated ethylenically unsaturated monomers.

DE-OS 40 10 176 describes aqueous base coat compositions containing binder dispersions which have been prepared by subjecting ethylenically unsaturated monomers in an organic solvent to a free radical-initiated polymerization in the presence of a polyurethane resin containing polymerizable double bonds and converting the reaction product thus obtained into an aqueous dispersion. Said DE-OS 40 10 176 does not mention a use of these binder dispersions for the preparation of aqueous clear-coat compositions.

Accordingly, it was the object of the present invention to provide an aqueous polymer dispersion which is suitable for use as a binder component for aqueous clear-coat compositions.

Said object is attained according to the invention by an aqueous polyester- and acrylate-based polymer dispersion obtainable by free radical-initiated polymerization of from 20 to 80% by weight of at least (a) one (meth)acrylic acid ester of mono- or polyalcohols, wherein said esters may still contain free hydroxyl groups, and
(b) one ethylenically unsaturated, at least monofunctional acid, and optionally
(c) one ethylenically unsaturated monomer other than (a) and (b) or mixtures thereof, with from 80 to 20% by weight of a polyester resin capable of undergoing a free radical-initiated polymerization, containing from 0.2 to 1.5 polymerizable double bonds per molecule and having a molecular weight of from 300 to 5,000, said resin being obtainable by a polycondensation of at least dihydric polyalcohols with at least dibasic polycarboxylic acids or derivatives thereof in the presence of polyalcohols and/or polycarboxylic acids containing at least one polymerizable double bond, the amounts employed of (a), (b) and (c) and the polyester resin being such that the resulting polymer has a hydroxyl value (OH value) of from 30 to 200 and an acid value of from 5 to 100.

As the (meth)acrylic acid ester (a) of mono- or polyalcohols, wherein said esters may still contain free hydroxyl groups, there are employed the esters of methanol, ethanol, propanol, iso-propanol and of butyl, tert.-butyl, iso-butyl, allyl, cyclohexyl, ethylhexyl, lauryl and stearyl alcohols and, as the esters of polyalcohols, the mono- and diesters of ethanediol, 1,2- and 1,3-propanediol, 1,4-butanediol or 1,6-hexanediol.

As the ethylenically unsaturated, at least monofunctional acid (b) there can be employed acrylic acid, methacrylic acid, vinylsulfonic acid, crotonic acid, maleic acid, fumaric acid, itaconic acid or the semi-esters of maleic acid, fumaric acid or itaconic acid.

As the ethylenically unsaturated monomer (c) other than (a) and (b) which may optionally be contained in the monomer mixture, there can be employed styrene, α-methylstyrene, vinyl toluene, acrylamide, methacrylamide, acrylonitrile or methacrylonitrile.

The preparation of polyester resins is carried out in accordance with conventional procedures well known to the artisan by esterification of dicarboxylic acids or suitable derivatives thereof, e.g. the conceivable anhydrides, with diols. The esterification proceeds in the presence of common esterification catalysts at elevated temperatures of, e.g., from 180° C. to 230° C. in the molten state.

As the at least dihydric polyalcohol there can be used ethyleneglycol, 1,3- and 1,2-propyleneglycol, 1,4-butanediol, 1,5-pentanediol, 1,6-hexanediol, 2,2-dimethylpropanediol, diethyleneglycol, triethyleneglycol, tetraethyleneglycol, hexaethyleneglycol, 1,3-dimethylolcyclohexane, 1,4-dimethylolcyclohexane, glycerol, trimethylolpropane or pentaerythritol.

As the at least dibasic polycarboxylic acids there can be used for the preparation of polyesters succinic acid, glutaric acid, adipic acid, azelaic acid, sebacic acid, phthalic acid, isophthalic acid, terephthalic acid, tetrahydrophthalic acid, hexahydrophthalic acid, endomethylenetetrahydrophthalic acid, 1,2-, 1,3- or 1,4-cyclohexanedicarboxylic acid, muconic acid and campboric acid, trimellitic acid, tricarballylic acid, dimethylolpropionic acid or the possible anhydrides thereof.

In order to introduce polymerizable double bonds into the polyester molecules, polyalcohols and/or polycarboxylic acids containing polymerizable double bonds are concomitantly used.

Examples of polyalcohols containing at least one polymerizable double bond are glycerol monoallylether, trimethylolpropane monoallylether, butenediol or dimethylolpropionic acid monoallylether.

Examples of polycarboxylic acids containing at least one polymerizable double bond are maleic acid, fumaric acid, itaconic acid or an addition product of allylglycidylether or glycidylmethacrylate to a polyester containing carboxyl groups.

It is also possible to prepare a polyester containing carboxyl groups and then, to said carboxyl groups, to add a monomer bearing oxirane groups such as, for example, allylglycidylether or glycidylmethacrylate.

Preferably the polyester resin contains from 0.5 to 1.0 polymerizable double bonds per molecule. Also preferred is a molecular weight of from 500 to 2,000 for the polyester resin.

The aqueous polymer dispersion preferably has a hydroxyl value of from 50 to 150. Acid values of from 15 to 40 are preferred for the aqueous dispersion.

It was another object of the invention to provide a process for producing the aqueous polymer dispersions according to the invention.

Said object is attained according to the invention by charging, in a fully or partially water-miscible organic solvent, from 80 to 20% by weight of a polyester resin capable of undergoing a free radical-initiated polymerization, containing from 0.2 to 1.5 polymerizable double bonds per molecule and having a molecular weight of from 300 to 5,000, said resin being obtainable by a polycondensation of at least dihydric polyalcohols with at least dibasic polycarboxylic acids or derivatives thereof in the presence of polyalcohols and/or polycarboxylic acids containing at least one polymerizable double bond, and adding to this polyester resin from 20 to 80% by weight of at least (a) one (meth)acrylic acid ester of mono- or polyalcohols, wherein said esters may still contain free hydroxyl groups, and (b) one ethylenically unsaturated, at least monofunctional acid, and optionally (c) one ethylenically unsaturated monomer other than (a) and (b) or mixtures thereof, subjecting the mixture to a polymerization in the presence of a free radical-generating initiator, and neutralizing the resulting product with a base followed by dispersing in water and removing the organic solvent by distillation, optionally under reduced pressure.

Preferred for use as the organic solvents are those fully or partially water-miscible. Here contemplated are, more specifically, ethanol, propanol, butanol, acetone, methylethylketone, methylisobutylketone, butylglycol, ethylenglycol, propyleneglycol, N-methylpyrrolidone, ethyleneglycol dimethylether, methoxybutanol, or diacetonealcohol.

As the free radical-generating initiators there are to be considered compounds such as, for example, di-tert.-butyl peroxide, dicumyl peroxide, dibenzoyl peroxide, dilauroyl peroxide, cumol hydroperoxide, tert.-butylhydroperoxide, tert.-butyl perbenzoate, tert.-butyl perpivalate, tert.-butyl per-3,5,5-trimethylhexanoate, tert.-butyl per-2-ethylhexanoate, di-2-ethylhexyl peroxydicarbonate, dicyclohexyl peroxydicarbonate, 1,1-bis-(tert.-butylperoxy)-3,5,5-trimethylcyclohexane, 1,1-bis(tert.-butylperoxy)cyclohexane, cyclohexanone peroxide, methylisobutylketone peroxide, 2,2'-azo-bis-(2,4-dimethylvaleronitrile), 2,2'-azo-bis-(2-methylbutyronitrile), 1,1-azo-bis-cyclohexanecarbonitrile or azo-bis-isobutyronitrile.

The free radical-initiated polymerization itself is carried at temperatures between 80° C. and 160° C.

The amounts employed of the monomers bearing hydroxyl groups (a), (b) and optionally (c) should be chosen so that the total system of the aqueous dispersion has a hydroxyl value, based on solids, of from 30 to 200, preferably of from 50 to 150 and particularly preferred from 80 to 120.

For the stability of the aqueous polymer dispersions it is important that the polymers produced in accordance with the invention contain a sufficient amount of groups capable of forming anions, preferably carboxyl groups. These may be introduced via the polyester component as well as via the (meth)acrylic acid component (a), but they may also be introduced via both of these components. However, preferred is the introduction via the (meth)acrylic acid component (a). The acid value of the polymers produced according to the invention may be between 5 and 100, and preferably between 15 and 40.

When polyunsaturated monomers (a), (b) and optionally (c) are used, there is a danger of gelation. Therefore it is necessary that the reaction conditions are adjusted to the types and amounts of such monomers. If desired or required it may make sense to concomitantly use so-called modifiers. Such modifiers have been described in EP-A-0 158 161. These are compounds such as, e.g., dodecylmercaptane or mercaptoethanol.

The polymerization is followed by converting the product into an aqueous dispersion. To this end, the groups capable of forming anions first must be at least partially neutralized. The neutralization is effected to a pH of from 7 to 10, and preferably of from 7.3 to 8.5.

For the neutralization there may be used bases such as ammonia or volatile primary, secondary and/or tertiary organic amines, especially ethylamine, dimethylamine, triethylamine, morpholine, piperidine, diethanolamine, triethanolamine, dimethylethanolamine or mixtures thereof. Especially preferred is dimethylethanolamine. It is advantageous to add the neutralizing agent as a diluted aqueous solution.

Once the dispersion has been completed, the organic solvent may be fully or partially removed by distillation, optionally under reduced pressure.

The solids content of the dispersions is between 30 and 55% by weight, and preferably between 35 and 50% by weight.

The polymer dispersions thus obtained can be used for the production of aqueous paints, especially aqueous clear-coat compositions for production-line application of two-layer coatings, especially for automotive bodies.

Thus, furthermore, the invention relates to aqueous coating compositions, more specifically aqueous clear-coat compositions containing the polyester- and acrylate-based aqueous polymer dispersion and a water-soluble or water-emulsifiable cross-linker. Therein, the ratio of the dispersion solids amount to the amount of cross-linker is between 60:40 and 85:15.

Suitable as cross-linking agent is any amino resin cross-linker as used in the field of painting, if it is water-soluble or can be rendered water-compatible by the addition of organic solvents. The amino resins which are water-soluble either per se or upon the addition of organic solvents are prepared following known procedures by the reaction of aldehydes, especially formaldehyde, with compounds bearing several amino or imino groups such as, e.g., melamine, urea, dicyandiamide and benzoguanidine or mixtures of such products. Melamine-formaldehyde resins are preferably employed.

The aqueous polymer dispersions may also be admixed with, in the place of the amino resins, water-emulsifiable polyurethanes as cross-linkers and can be processed as two-component clear-coat compositions and cured at room temperature. Water-compatible end-capped (blocked) polyisocyanates may also be used as cross-linkers.

The coating compositions according to the invention may contain, in addition to the polymer dispersions according to the invention, further water-compatible binders, such as polyesters, polyethers, polyurethanes, polyacrylates and aminoplastic resins.

The clear-coat compositions according to the invention may also contain conventional additives in addition to minor amounts of organic solvents. The proportion of organic solvents is between 5 and 20% by weight, and preferably less than 15% by weight. Particularly preferred solvents are 1,2-propanediol and butyldiglycol.

The conventional additives may include, for example, levelling agents, deaerating agents, dispersion aids, light-protective agents, anti-settling agents or rheology aids.

The clear-coat compositions according to the invention may be applied by conventional application techniques. The preferred application technique is spraying, preferably using electrostatic high-speed turbo bells. The clear-coat compositions may also be applied, however, by brushing, knife-coating or immersion.

The clear-coat compositions according to the invention may be applied to have the conventional layer thicknesses.

The clear-coat compositions according to the invention are particularly suitable for a use as top clear-coat in multi-layer coating in the automobile industry. They are in particular distinguished over the conventional systems containing organic systems by the low content of organic solvents along with high content of solids and a low viscosity. Due to the low content of organic solvents, the aqueous clear-coat compositions are further distinguished by a high environmental compatibility.

The aqueous clear-coat compositions may be applied "wet-in-wet" onto an aqueous or non-aqueous base coating. The wet-in-wet application does not exclude that the base coating is allowed to become touch dry before the clear-coat composition is applied; both coatings are commonly cured or baked, respectively (e.g. at from 130° C. to 160° C. for from 15 to 30 minutes).

The clear-coat films obtained from the aqueous clear-coat composition systems according to the invention are characterized by an equally high level of properties as that of the known solvent-containing systems. Properties such as, e.g., surface hardness, clarity, gloss, fullness, levelling, scratch resistance, elasticity, resistance against solvents, creams and polishes, certain chemicals such as sulfuric acids, sodium hydroxide solution, brake fluid, diesel and Otto fuel, short- and long-term weatherability are at least as good as, normally even better than, those of known solvent-containing systems or other aqueous systems as known in the art.

The aqueous polymer dispersions as well as the aqueous clear-coat compositions produced therefrom have a good storage stability.

The following Examples are provided to illustrate the invention.

EXAMPLES

Polyester A

In a 2 liter reaction vessel equipped with stirrer and packed column, 92 parts of 1,6-hexanediol, 73 parts of trimethylolpropane monoallylether, 250 parts of neopentylglycol, 80 parts of trimethylolpropane, 554 parts of cyclohexane-1,2-dicarboxylic acid anhydride and 2 parts of dibutyltin oxide were melted and heated while stirred so that the column-head temperature would not exceed 100° C. In this operation, the temperature of the reaction mixture should not exceed 130° C. Esterification is continued until an acid value of <4 is reached. After cooling to <80° C., the mixture is diluted with 328 parts of methylethylketone to a solids content of 75%.

There is obtained a polyester having a calculated average molecular weight of 1680 and a hydroxyl value of 100 (relative to solid resin).

Polyester B

There are employed 92 parts of 1,6-hexanediol, 55 parts of glycerol monoallylether, 250 parts of neopentylglycol, 80 parts of trimethylolpropane, 554 parts of cyclohexane-1,2-dicarboxylic acid anhydride and 2 parts of dibutyltin oxide.

The polyester preparation is carried out as described for Polyester A.

After the esterification the solids content is adjusted to 75% with methylethylketone.

There is obtained a polyester having a calculated average molecular weight of 1570 and a hydroxyl value of 107 (relative to solid resin).

Polyester C

There are employed 92 parts of 1,6-hexanediol, 48 parts of allylglycidylether, 250 parts of neopentylglycol, 80 parts of trimethylolpropane, 554 parts of cyclohexane-1,2-dicarboxylic acid anhydride and 2 parts of dibutyltin oxide.

The polyester preparation is carried out as described for Polyester A.

After the esterification the solids content is adjusted to 75% with methylethylketone.

There is obtained a polyester having a calculated average molecular weight of 1570 and a hydroxyl value of 107 (relative to solid resin).

Polyester D

There are employed 92 parts of 1,6-hexanediol, 209 parts of trimethylolpropane monoallylether, 169 parts of neopentylglycol, 80 parts of trimethylolpropane, 554 parts of cyclohexane-1,2-dicarboxylic acid anhydride and 2 parts of dibutyltin oxide.

The polyester preparation is carried out as described for Polyester A.

After the esterification the solids content is adjusted to 75% with methylethylketone.

There is obtained a polyester having a calculated average molecular weight of 1680 and a hydroxyl value of 100 (relative to solid resin).

Polyester E

There are employed 142 parts of 1,6-hexanediol, 250 parts of neopentylglycol, 80 parts of trimethylolpropane, 508 parts of cyclohexane-1,2-dicarboxylic acid anhydride, 29 parts of maleic anhydride, 2 parts of dibutyltin oxide and 0.15 parts of Jonol CP.

The polyester preparation is carried out as described for Polyester A.

After the esterification the solids content is adjusted to 75% with methylethylketone.

There is obtained a polyester having a calculated average molecular weight of 1570 and a hydroxyl value of 107 (relative to solid resin).

Polyester F

There are employed 92 parts of 1,6-hexanedi01, 37 parts of butene-2-diol, 250 parts of neopentylglycol, 80 parts of trimethylolpropane, 554 parts of cyclohexane-1,2-dicarboxylic acid anhydride and 2 parts of dibutyltin oxide.

The polyester preparation is carried out as described for Polyester A.

After the esterification the solids content is adjusted to 75% with methylethylketone.

There is obtained a polyester having a calculated average molecular weight of 1530 and a hydroxyl value of 110 (relative to solid resin).

Example 1

In a 4 liter reaction vessel equipped with stirrer, thermometer, reflux condenser and two feed vessels, weighed amounts of 532 parts of the polyester resin A and of 76 parts of methylethylketone together are charged. One of the two feed vessels is filled with a weighed amount of a monomer mixture consisting of 103 parts of butyl methacrylate, 20 parts of monostyrene, 48 parts of 2-hydroxypropyl acrylate, 53 parts of 2-hydroxypropyl methacrylate and 17 parts of acrylic acid. In the other feed vessel there is prepared an initiator solution consisting of 10 parts of 2,2'-azo-bis-isobutyronitrile (AIBN) and 69 parts of methylethylketone. After the contents of the reaction vessel has been heated to 80° C., the monomer mixture is added within 3 hours, while the polymerization initiator solution is simultaneously added within 3.5 hours. The polymerization temperature is maintained at 80° C. Upon completion of the material feeds, stirring is continued at 80° C. for another 1.5 hours. Then 13 parts of dimethylethanolamine (corresponding to a degree of neutralization of 60%) and 1,000 parts of fully desalted water are added. The methylethylketone is distilled off under reduced pressure at a maximum of 55° C.

A dispersion is obtained which has a solids content of 43% and a pH value of 7.70. The polymer has an acid value of 18 and a hydroxyl value of 111.

Example 2

In a 4 liter reaction vessel equipped with stirrer, reflux condenser and two feed vessels, weighed amounts of 532 parts of the polyester B and of 76 parts of methylethylketone together are charged. The procedure is the same as in Example 1.

After the removal of the methylethylketone, a dispersion is obtained which has a solids content of 40% and a pH value of 7.50.

Example 3

In a 4 liter reaction vessel equipped with stirrer, reflux condenser and two feed vessels, weighed amounts of 532 parts of the polyester C and of 76 parts of methylethylketone together are charged. The procedure is the same as in Example 1.

After the removal of the methylethylketone, a dispersion is obtained which has a solids content of 38% and a pH value of 7.65.

Example 4

In a 4 liter reaction vessel equipped with stirrer, reflux condenser and two feed vessels, weighed amounts of 532 parts of the polyester D and of 76 parts of methylethylketone together are charged. In addition, 14 parts of mercaptoethanol are added to the monomer mixture. Otherwise the procedure is the same as in Example 1.

After the removal of the methylethylketone, a dispersion is obtained which has a solids content of 39% and a pH value of 7.70.

Example 5

In a 4 liter reaction vessel equipped with stirrer, reflux condenser and two feed vessels, weighed amounts of 532 parts of the polyester E and of 76 parts of methylethylketone together are charged. The procedure is the same as in Example 1.

After the removal of the methylethylketone, a dispersion is obtained which has a solids content of 46% and a pH value of 7.30.

Example 6

In a 4 liter reaction vessel equipped with stirrer, reflux condenser and two feed vessels, weighed amounts of 532 parts of the polyester F and of 76 parts of methylethylketone together are charged. The procedure is the same as in Example 1.

After the removal of the methylethylketone, a dispersion is obtained which has a solids content of 42% and a pH value of 7.40.

Example 7

In a 4 liter reaction vessel equipped with stirrer, reflux condenser and two feed vessels, weighed amounts of 532 parts of the polyester A and of 76 parts of methylethylketone together are charged. The monomer mixture consists of 84 parts of butyl methacrylate, 84 parts of tert.-butyl acrylate, 20 parts of monostyrene, 38 parts of 2-ethylhexyl acrylate, 48 parts of 2-hydroxypropyl acrylate, 53 parts of 2-hydroxypropyl methacrylate and 17 parts of acrylic acid. The procedure is the same as in Example 1.

After the removal of the methylethylketone, a dispersion is obtained which has a solids content of 41% and a pH value of 7.90.

Example 8

In a 4 liter reaction vessel equipped with stirrer, reflux condenser and two feed vessels, weighed amounts of 532 parts of the polyester A and of 76 parts of methylethylketone together are charged. The monomer mixture consists of 84 parts of butyl methacrylate, 84 parts of tert.-butyl acrylate, 20 parts of monostyrene, 38 parts of stearyl acrylate, 48 parts of 2-hydroxypropyl acrylate, 53 parts of 2-hydroxypropyl methacrylate and 17 parts of acrylic acid. The procedure is the same as in Example 1.

After the removal of the methylethylketone, a dispersion is obtained which has a solids content of 38% and a pH value of 7.90.

Example 9

In a 4 liter reaction vessel equipped with stirrer, thermometer, reflux condenser and two feed vessels, weighed amounts of 532 parts of the polyester resin A and of 76 parts of methylethylketone together are charged. One of the two feed vessels is filled with a weighed amount of a monomer mixture consisting of 103 parts of butyl methacrylate, 103 parts of tert.-butyl acrylate, 20 parts of monostyrene, 48 parts of 2-hydroxypropyl acrylate and 53 parts of 2-hydroxypropyl methacrylate. In the other feed vessel there is prepared the initiator solution consisting of 3 parts of 2,2'-azo-bis-isobutyronitrile (AIBN) and 69 parts of methylethylketone. After the contents of the reaction vessel has been heated to 80° C., the monomer mixture is added within 1 hour and 45 minutes. Immediately subsequently thereto, 25 parts of acrylic acid are added within 15 minutes. The polymerization initiator solution is simultaneously added within 2.5 hours. The polymerization temperature is maintained at 80° C. Upon completion of the material feeds, stirring is continued at 80° C. for another 1.5 hours. Then 27 parts of dimethylethanolamine (corresponding to a degree of neutralization of 80%) and 1,000 parts of fully desalted water are added. The methylethylketone is distilled off under reduced pressure at a maximum of 55° C.

A dispersion is obtained which has a solids content of 42% and a pH value of 7.70. The polymer has an acid value of 27 and a hydroxyl value of 111.

Example 10

In a 4 liter reaction vessel equipped with stirrer, thermometer, reflux condenser and two feed vessels, weighed amounts of 532 parts of the polyester resin A and of 76 parts of methylethylketone together are charged. One of the two feed vessels is filled with a weighed amount of a monomer mixture consisting of 75 parts of butyl methacrylate, 75 parts of tert.-butyl acrylate, 74 parts of monostyrene, 48 parts of 2-hydroxypropyl acrylate and 53 parts of 2-hydroxypropyl methacrylate feed the other feed vessel there is prepared the initiator solution consisting of 10 parts of 2,2'-azo-bis-isobutyronitrile (AIBN) and 69 parts of methylethylketone. After the contents of the reaction vessel has been heated to 80° C., the monomer mixture is added within 2 hours and 40 minutes. Immediately subsequently thereto, 25 parts of acrylic acid are added within 20 minutes. The polymerization initiator solution is simultaneously added within 3.5 hours. The polymerization temperature is maintained at 80° C. Upon completion of the material feeds, stirring is continued at 80° C. for another 1.5 hours. Then 33 parts of dimethylethanolamine (corresponding to a degree of neutralization of 100%) and 1,000 parts of fully desalted water are added. The methylethylketone is distilled off under reduced pressure at a maximum of 55° C.

A dispersion is obtained which has a solids content of and a pH value of 8.50. The polymer has an acid value of 27 and a hydroxyl value of 111.

Comparative Examples

Polyester G (Comparative Example of EP-A-0 391 271)

The components employed are 92 parts of 1,6-hexanediol, 293 parts of neopentylglycol, 80 parts of trimethylolpropane, 554 parts of cyclohexane-1,2-dicarboxylic acid anhydride and 2 parts of dibutyltin oxide. The preparation of the polyester is carried out in the same manner as described for Polyester A. After the esterification, the solids content is adjusted to 80% with methylethylketone.

There is obtained a polyester having a calculated average molecular weight of 1590 and a hydroxyl value of 106 (relative to solid resin).

Polyester H (Comparative Example of EP-A-0 391 271)

The components employed are 354 parts of 1,6-hexanediol, 402 parts of trimethylolpropane and 438 parts of adipic acid. The preparation of the polyester is carried out in the same manner as described for Polyester A.

There is obtained a polyester having a calculated average molecular weight of 362 and a hydroxyl value of 465.

Polyester I (Comparative Example of DE-OS-40 10 176)

The components employed are 366 parts of 1,6-hexanediol, 323 parts of neopentylglycol and 679 parts of adipic acid. The preparation of the polyester is carried out in the same manner as described for Polyester A.

There is obtained a polyester having a calculated average molecular weight of 362 and a hydroxyl value of 145.

Example 11

In a 4 liter reaction vessel equipped with stirrer, reflux condenser and two feed vessels, weighed amounts of 499 parts of the polyester G and of 109 parts of methylethylketone together are charged. The procedure is the same as in Example 1. For producing the dispersion in water, 23 parts of dimethylethanolamine (corresponding to a degree of neutralization of 100%) and 1,400 parts of fully desalted water are used.

After the removal of the methylethylketone, an unstable dispersion is obtained which very settles to a very high extent within a short time.

Example 12

In a 4 liter reaction vessel equipped with stirrer, reflux condenser and two feed vessels, weighed amounts of 499 parts of the polyester G and of 109 parts of methylethylketone together are charged. The monomer mixture consists of 95 parts of butyl methacrylate, 95 parts of tert.-butyl acrylate, 20 parts of monostyrene, 48 parts of 2-hydroxypropyl acrylate, 53 parts of 2-hydroxypropyl methacrylate and 34 parts of acrylic acid. For producing the dispersion in water, 42 parts of dimethylethanolamine (corresponding to a degree of neutralization of 100%) and 1,400 parts of fully desalted water are used. Otherwiese, the procedure is the same as in Example 1.

After the removal of the methylethylketone, an instable dispersion is obtained which very settles to a very high extent within a short time.

Example 13

(Comparative Example of EP-A-0 391 271)

In a 2 liter reaction vessel equipped with stirrer, reflux condenser and one feed vessel, 359 parts of the polyester H and 156 parts of butylglycol are charged and heated to 140° C.

Thereto added over 4 hours is a metered amount of a mixture of 276 parts of butanediol monoacrylate, 473 parts of tert.-butyl acrylate, 37 parts of acrylic acid and 50 parts of tert.-butyl perbenzoate, followed by after-polymerization for another 4 hours.

Example 14

(Comparative Example of EP-A-0 365 775)

In a 2 liter reaction vessel equipped with stirrer, reflux condenser and two feed vessels, a weighed amount of 200 parts of butylglycol is charged and heated to 140° C.

One of the two feed vessels is filled with a weighed amount of a monomer mixture consisting of 200 parts of butyl methacrylate, 220 parts of butyl acrylate, 150 parts of monostyrene, 150 parts of methyl methacrylate and 230 parts of 2-hydroxypropyl acrylate. In the other feed vessel there is prepared the initiator solution consisting of 45 parts of tert.-butyl perbenzoate and 50 parts of butylglycol. After the contents of the reaction vessel has been heated to 140° C., the monomer mixture is added within 3 hours and 50 minutes. Immediately subsequently thereto, 50 parts of acrylic acid are added within 20 minutes. The polymerization initiator solution is simultaneously added within 3.5 hours. The polymerization temperature is maintained at 140° C. Upon completion of the material feeds, stirring is continued at 80° C. for another 2.5 hours. After cooling, 49 parts of dimethylethanolamine (corresponding to a degree of neutralization of 80%) and 383 parts of deionized water are added. A dispersion is obtained which has a solids content of 60%.

Example 15

(Comparative Example of DE-OS-40 10 176)

In a 6 liter reaction vessel equipped with stirrer, thermometer and reflux condenser, a weighed amount of 343 parts of the polyester I, 29 parts of neopentylglycol, 18 parts of trimethylolpropanemonoallyl ether, 258 parts of methylethylketone, 259 parts of isophorone diisocyanate and 0.4 parts dibutyltin dilaurate is charged and then heated to 80° C. under a nitrogen atmosphere. At an NCO content of 2%, 55 parts of trimethylolpropane are added. The reaction is continued at 80° C. until the NCO content is 0%. Then, 253 parts of methylethylketone are added.

One of the two feed vessels is filled with a weighed amount of a monomer mixture consisting of 232 parts of methyl methacrylate, 232 parts of butyl acrylate, 285 parts of 2-hydroxypropyl methacrylate and 36 parts of acrylic acid. In the other feed vessel there is prepared the initiator solution consisting of 24 parts of 2,2'-azo-bis-isobutyronitrile (AIBN) and 158 parts of methylethylketone. At 80° C., the monomer mixture is added within 3 hours. The polymerization initiator solution is simultaneously added within 3.5 hours. The polymerization temperature is maintained at 80° C. Upon completion of the material feeds, stirring is continued at 80° C. for another 2.5 hours. Then 36 parts of dimethylethanolamine (corresponding to a degree of neutralization of 80%) and 1,750 parts of fully desalted water are added. The methylethylketone is distilled off under reduced pressure at a maximum of 55

A dispersion is obtained which has a solids content of 41% and a pH value of 7.40. The polymer has an acid value of 18 and a hydroxyl value of 100.

Application Examples 1 through 10 (Use of the Preparative Examples 1 through 10)

By means of a high-speed stirrer, 266 parts (based on solid resin) of each of the binder dispersions of Examples 1 to 10 are well mixed with 127 parts of a 90% solution of a commercially available water-dilutable melamine-formaldehyde resin (Cymel 327®) and 95 parts of 1,2-propanediol in sequence. Then, the pH value is adjusted to from 8.60 to 8.70 with dimethylethanolamine. Subsequently thereto, each of a mixture of 0.09 parts of a commercially available levelling agent (Fluorad FC 430®) and 0.81 parts of butylglycol as well as 4.6 parts of a commercially available silicone resin-containing additive (Additol XW329®) are added in sequence and admixed. In each case the viscosity is adjusted to 27 s (measured in a DIN 4 mm beaker at 20° C.) with fully desalted water.

Application Example 11 (Use of the Comparative Example 13 corresponding to EP-A-0 391 271)

By means of a high-speed stirrer, 250 parts of the binder dispersion of Example 13 are well mixed with 148 parts of a 90% solution of a commercially available water-dilutable melamine- formaldehyde resin (Cymel 327®) and 36 parts of butylglycol in sequence. Then, the pH is adjusted to from 8.60 to 8.70 with dimethylethanolamine. The viscosity is adjusted with desalted water.

Application Example 12 (Use of the Comparative Example 14 corresponding to EP-A-0 365 775)

By means of a high-speed stirrer, 400 parts of the binder dispersion of Example 14 are well mixed with 66 parts a 90% solution of a commercially available water-dilutable melamineformaldehyde resin (Cymel 327®) and of a commercially available levelling agent (Fluorad FC 430®) in sequence. Then, the pH is adjusted to from 8.60 to 8.70 with dimethylethanolamine. Thereafter, the viscosity is adjusted with desalted water.

Application Example 13 (Use of the Comparative Example 15)

By means of a high-speed stirrer, 500 parts of the binder dispersion of Example 15 are well mixed with 99 parts of a 90% solution of a commercially available water-dilutable melamineformaldehyde resin (Cymel 327®) and 25 parts of 1,2-propanediol in sequence. Then the pH is adjusted to from 8.60 to 8.70 with dimethylethanolamine. Subsequently, a mixture of 0.07 parts of a commercially available levelling agent (Fluorad FC 430®) and 0.63 parts of butylglycol as well as 1.4 parts of a commercially available silicone resin-containing additive (Additol XW329®) and 25 parts of Dowanol DPnB are added in sequence and admixed. The viscosity is adjusted to 27 s (measured in a DIN 4 mm beaker at 20° C.) with fully desalted water.

The obtained clear-coat compositions were sprayed to have a layer thickness of from 35 to 40 μm onto a water-dilutable metallic base coating which in advance had been allowed to become touch dry at 100° C. for 10 minutes, were first dried at 80° C. for 10 minutes, and were baked at 150° C. for 20 minutes.

The resulting coatings were tested (see Table 1).

TABLE 1

| Application Example | 1 | 2 | 3 | 4 | 5 | 6 | 7 | 8 | 9 | 10 | Comparative Experiments 11 | 12 | 13 |
|---|---|---|---|---|---|---|---|---|---|---|---|---|---|
| Spray viscosity (seconds) | 27 | 27 | 27 | 27 | 27 | 27 | 27 | 27 | 27 | 27 | 35 | 24 | 27 |
| Solids content (%) | 40 | 41 | 40 | 40 | 40 | 41 | 41 | 37 | 37 | 44 | 51 | 41 | 35 |
| Adhesion | GT 0 | GT 0 | GT 0 | GT 0 | GT 0 | GT 0 | GT 0 | GT 0 | GT 0 | GT 0 | GT 1 | GT 0 | GT 0 |
| Condensed water test | + | + | + | + | + | + | + | + | + | + | − | + | + |
| Xylene resistance | + | + | ++ | + | + | + | ++ | ++ | ++ | ++ | + | — | ++ |
| H$_2$SO$_4$ resistance | + | + | + | + | + | + | ++ | ++ | + | ++ | — | — | — |
| NaOH resistance | ++ | ++ | ++ | ++ | ++ | ++ | ++ | ++ | ++ | ++ | ++ | — | ++ |
| Knoop hardness | 14.8 | 15.8 | 15.3 | 12.7 | 18.9 | 14.8 | 15.2 | 15.8 | 14.9 | 23.7 | 15.8 | 3.6 | 15.8 |
| Indentation | 5.0 | 8.4 | 9.9 | 9.1 | 8.5 | 8.7 | 7.1 | 6.5 | 6.7 | 7.0 | 7.4 | 10.2 | 6.4 |

[++] = very good, [+] = good, [−] = poor, [—] = very poor.

We claim:

1. An aqueous polyester- and acrylate-based polymer dispersion, obtained by free radical-initiated polymerization of from 80 to 20% by weight of at least
   (a) one (meth)acrylic acid ester of mono- or polyalcohols, wherein said esters may still contain free hydroxyl groups, and
   (b) one ethylenically unsaturated, at least monofunctional acid, with from 20 to 80% by weight of a polyester resin capable of undergoing a free radical-initiated polymerization, containing from 0.2 to 1.5 polymerizable double bonds per molecule and having a molecular weight of from 300 to 5,000, said resin obtained by a polycondensation of at least dihydric polyalcohols with at least dibasic polycarboxylic acids or derivatives thereof in the presence of polyalcohols, containing at least one polymerizable double bond, the amounts employed of (a) and (b) and the polyester resin being such that the resulting polymer has a hydroxyl value (OH value) of from 30 to 200 and an acid value of from 5 to 40.

2. The aqueous polymer dispersion according to claim 1, further comprising, in addition to (a) and (b), (c) one ethylenically unsaturated monomer, other than (a) and (b), wherein the amounts employed of (a), (b) and (c) and the polyester resin being such that the resulting polymer has a hydroxyl value of from 30 to 200 and an acid value of from 5 to 40.

3. The aqueous polymer dispersion according to claim 1, wherein the (meth)acrylic acid ester of monoalcohols are selected from the group consisting of esters of methanol, ethanol, propanol, iso-propanol, and of butyl, tert.-butyl, iso-butyl, allyl, cyclohexyl, ethylhexyl, lauryl and stearyl alcohols, and the (meth)acrylic acid ester of polyalcohols are selected from the group consisting of mono- and diesters of ethanediol, 1,2- and 1,3-propanediol, 1,4-butanediol, and 1,6-hexanediol.

4. The aqueous polymer dispersion according to claim 1, wherein the ethylenically unsaturated, at least monofunctional acid is selected from the group consisting of acrylic acid, methacrylic acid, vinylsulfonic acid, crotonic acid, maleic acid, fumaric acid, itaconic acid, and the semi-esters of maleic acid, fumaric acid, and itaconic acid.

5. The aqueous polymer dispersion according to claim 2, wherein the ethylenically unsaturated monomer other than (a) and (b) is selected from the group consisting of styrene, α-methylstyrene, vinyl toluene, acrylamide, methacrylamide, acrylonitrile, and methacrylonitrile.

6. The aqueous polymer dispersion according to claim 1, wherein the at least dihydric polyalcohol is selected from the group consisting of ethylene-glycol, 1,3- and 1,2-propyleneglycol, 1,4-butanediol, 1,5-pentanediol, 1,6-hexanediol, 2,2-dimethylpropanediol, diethyleneglycol, triethyleneglycol, tetraethyleneglycol, hexaethyleneglycol, 1,3-dimethylolcyclohexane, 1,4-dimethylolcyclohexane, glycerol, trimethylolpropane, and pentaerythritol.

7. The aqueous polymer dispersion according to claim 1, wherein the at least dibasic polycarboxylic acids are selected from the group consisting of succinic acid, glutaric acid, adipic acid, azelaic acid, sebacic acid, phthalic acid, isophthalic acid, terephthalic acid, tetrahydrophthalic acid, hexahydrophthalic acid, endomethylenetetrahydrophthalic acid, 1,2-, 1,3- or 1,4-cyclohexanedicarboxylic acid, muconic acid and camphoric acid, trimellitic acid, tricarballylic acid, dimethylolpropionic acid, and anhydrides thereof.

8. The aqueous polymer dispersion according to claim 1, wherein the polyalcohol containing at least one polymerizable double bond is selected from the group consisting of glycerol monoallylether, trimethylolpropane monoallylether, butenediol, dimethylolpropionic acid monoallylether and an addition product of allylglycidylether or glycidylmethacrylate to a polyester containing carboxyl groups.

9. The aqueous polymer dispersion according to claim 1, wherein the polyester resin contains from 0.5 to 1.0 polymerizable double bonds.

10. The aqueous polymer dispersion according to claim 1 having a hydroxyl value of from 50 to 150.

11. The aqueous polymer dispersion according to claim 10 having a hydroxyl value of from 80 to 120.

12. The aqueous polymer dispersion according to claim 1 having an acid value of from 15 to 40.

13. A process for producing an aqueous polymer dispersion comprising charging, in a fully or partially water-miscible organic solvent, from 20 to 80% by weight of a polyester resin capable of undergoing a free radical-initiated polymerization, containing from 0.2 to 1.5 polymerizable double bonds per molecule and having a molecular weight of from 300 to 5,000, said resin obtained by a polycondensation of at least dihydric polyalcohols with at least dibasic polycarboxylic acids or derivatives thereof in the presence of polyalcohols containing at least one polymerizable double bond, and adding to this polyester resin from 80 to 20% by weight of at least
   (a) one (meth)acrylic acid ester of mono- or polyalcohols, wherein said esters may still contain free hydroxyl groups, and
   (b) one ethylenically unsaturated, at least monofunctional acid, subjecting the mixture to a polymerization in the presence of a free radical-generating initiator, and neutralizing the resulting product with a base followed by dispersing in water and removing the organic solvent by distillation.

14. The process according to claim 13, further comprising in addition to (a) and (b), (c) one ethylenically unsaturated monomer other than (a) and (b).

15. The process according to claim 13, further comprising removing the organic solvent by distillation under reduced pressure.

16. The process according to claim 13, wherein the organic solvent is selected from the group consisting of ethanol, propanol, butanol, acetone, methylethylketone, methylisobutylketone, butylglycol, ethyleneglycol, propyleneglycol, N-methylpyrrolidone, ethyleneglycol dimethylether, methoxybutanol, or diacetonealcohol.

17. The process according to claim 13, wherein the free radical-generating initiator is selected from the group consisting of di-tert.-butyl peroxide, dicumyl peroxide, dibenzoyl peroxide, dilauryl peroxide, cumol hydroperoxide, tert.-butyl hydroperoxide, tert.-butyl perbenzoate, tert.-butyl perpivalate, tert.-butyl per-3,5,5-trimethylhexanoate, tert.-butyl per-2-ethylhexanoate, di-2-ethylhexyl peroxydicarbonate, dicyclohexyl peroxydicarbonate, 1,1,-bis(tert.-butylperoxy)-3,5,5-trimethylcyclohexane, 1,1-bis (tert.-butylperoxy) cyclohexane, cyclohexanone peroxide, methylisobutylketone peroxide, 2,2'azo-bis-(2,4-dimethylvaleronitrile), 2,2'-azo-bis-(2-methylbutyronitrile), 1,1 -azo-bis-cyclohexanecarbonitrile, and azo-bis-isobutyronitrile.

18. The process according to claim 13, wherein the base is selected rom the group consisting of ammonia, volatile primary, secondary, and/or tertiary organic amines, and mixtures thereof.

19. The process according to claim 13, wherein the base is selected from the group consisting of ethylamine, dimethylamine, triethylamine, morpholine, piperidine, diethanolamine, triethanolamine, dimethylethanolamine, and mixtures thereof.

20. The process according to claim 13, wherein the polymerization is carried out at a temperature of between 80° C. and 160° C.

21. The process according to claim 13, wherein the neutralization is effected to a pH of from 7 to 10.

22. The process according to claim 21, wherein the neutralization is effected to a pH of from 7.5 to 9.

23. An aqueous polyester- and acrylate-based coating composition in admixture with an amino resin as a cross-linker containing lacquer additives, wherein the polyester and acrylic resin component is an aqueous dispersion obtained by free radical-initiated polymerization of from 80 to 20% by weight of at least (a) one (meth)acrylic acid ester of mono- or polyalcohols, wherein said esters may still contain free hydroxyl groups, and (b) one ethylenically unsaturated, at least monofunctional acid, with from 20 to 80% by weight of a polyester resin capable of undergoing a free radical-initiated polymerization, containing from 0.2 to 1.5 polymerizable double bonds per molecule and having a molecular weight of from 300 to 5,000, said resin obtained by a polycondensation of at least dihydric polyalcohols with at least dibasic polycarboxylic acids or derivatives thereof in the presence of polyalcohols, containing at least one polymerizable double bond, the amounts employed of (a) and (b) and the polyester resin being such that the resulting polymer has a hydroxyl value (OH value) of from 30 to 200 and an acid value of from 5 to 40.

24. The aqueous coating composition according to claim 23, wherein the amino resin is selected from the group consisting of water-soluble, water-dispersible, or both, amino resins.

25. The aqueous coating composition according to claim 24, wherein the amino resin is prepared by the reaction of aldehydes with compounds bearing a plurality of amino or imino groups.

26. The aqueous coating composition according to claim 24, wherein the amino resin is a melamine-formaldehyde resin.

27. The aqueous coating composition according to claim 23 in the form of a clear-coat composition.

28. The aqueous coating composition according to claim 23, comprising 1,2-propanediol as a solvent.

29. A clear-coat composition for the manufacture of multi-layer coatings, comprising an aqueous coating composition according to claim 23.

30. An aqueous polyester- and acrylate-based coating composition in admixture with a water-emulsifiable polyisocyanate as a cross-linker containing lacquer additives, wherein the polyester and acrylic resin component is an aqueous dispersion obtained by free radical-initiated polymerization of from 80 to 20% by weight of at least (a) one (meth)acrylic acid ester of mono- or polyalcohols, wherein said esters may still contain free hydroxyl groups, and (b) one ethylenically unsaturated, at least monofunctional acid, with from 20 to 80% by weight of a polyester resin capable of undergoing a free radical-initiated polymerization, containing from 0.2 to 1.5 polymerizable double bonds per molecule and having a molecular weight of from 300 to 5,000, said resin obtained by a polycondensation of at least dihydric polyalcohols with at least dibasic polycarboxylic acids or derivatives thereof in the presence of polyalcohols, containing at least one polymerizable double bond, the amounts employed of (a) and (b) and the polyester resin being such that the resulting polymer has a hydroxyl value (OH value) of from 30 to 200 and an acid value of from 5 to 40.

31. The aqueous coating composition according to claim 30 in the form of a clear-coat composition.

32. The aqueous coating composition according to claim 30, comprising 1,2-propanediol as a solvent.

33. A clear-coat composition for the manufacture of multi-layer coatings, comprising an aqueous coating composition according to claim 30.

* * * * *

Disclaimer

5,648,410 — Hans Dieter Hille, Bergisch Gladbach (DE); and Horst Müller, Köln (DE). AQUEOUS POLYMER DISPERSIONS FOR CLEAR COATS. Patent dated July 15, 1997. Disclaimer filed October 30, 2013, by the inventors.

Hereby disclaims complete claims 1-33 of said patent.

*(Official Gazette, April 7, 2015)*